(12) United States Patent
Betin et al.

(10) Patent No.: US 6,992,818 B2
(45) Date of Patent: Jan. 31, 2006

(54) SELF-ADJUSTING INTERFEROMETRIC OUTCOUPLER AND METHOD

(75) Inventors: Alexander A. Betin, Manhattan Beach, CA (US); Robert W. Byren, Manhattan Beach, CA (US); Dana P. Franz, Hermosa Beach, CA (US)

(73) Assignee: Raytheon Company, Waltham, MA (US)

( * ) Notice: Subject to any disclaimer, the term of this patent is extended or adjusted under 35 U.S.C. 154(b) by 319 days.

(21) Appl. No.: 10/340,277

(22) Filed: Jan. 10, 2003

(65) Prior Publication Data

US 2004/0136051 A1     Jul. 15, 2004

(51) Int. Cl.
*H04B 10/12* (2006.01)
*H01S 3/00* (2006.01)

(52) U.S. Cl. .................................... 359/338
(58) Field of Classification Search ............... 359/338
See application file for complete search history.

(56) References Cited

U.S. PATENT DOCUMENTS

| | | | |
|---|---|---|---|
| 3,700,309 A | | 10/1972 | Buczek |
| 4,390,991 A | * | 6/1983 | Pearson .................. 372/21 |
| 4,734,911 A | | 3/1988 | Bruesselbach |
| 4,765,740 A | * | 8/1988 | Fischer .................. 356/459 |
| 5,126,876 A | * | 6/1992 | O'Meara .................. 359/338 |
| 5,483,342 A | | 1/1996 | Rockwell |
| 5,726,795 A | | 3/1998 | Betin et al. |
| 5,729,380 A | | 3/1998 | Betin et al. |
| 6,278,547 B1 | | 8/2001 | Betin |
| 6,346,686 B1 | * | 2/2002 | Betin et al. ............ 219/121.61 |

FOREIGN PATENT DOCUMENTS

EP     0 452 838     10/1991

OTHER PUBLICATIONS

Putnam, M.A. et al: "Single Pulse Fabrication of fibre Bragg gratings using a phase-conjugated KrF excimer laser" Electronics Letters, IEE Stevenage, GB, vol. 31, No. 11, May 25, 1995, ISSN: 0013-5194 (the whole document).

(Continued)

*Primary Examiner*—Mark Hellner
(74) *Attorney, Agent, or Firm*—John E. Gunther; Leonard A. Alkov; Karl A. Vick

(57) ABSTRACT

A self-adjusting interferometric outcoupler. In the most general sense, the invention is an optical system (100) comprising a first mechanism (112) for generating a first beam, a second mechanism (122) for receiving the first beam and returning a second beam, and an interferometer (116) positioned to couple the first beam to the second mechanism (122) and to receive and output the second beam, wherein the interferometer (116) is also shared by the first mechanism (112) and/or the second mechanism (122) to control the frequency of the first beam and/or the second beam, respectively. In the illustrative embodiment, the first mechanism (112) is a master oscillator, the second mechanism (122) is a phase conjugate mirror, and the system (100) further includes a power amplifier (118) positioned to amplify the first beam during a first pass and to amplify the second beam during a second pass.

17 Claims, 5 Drawing Sheets

OTHER PUBLICATIONS

Anikeev, I.Y. et al: "Variation in the coherence length of a phase conjugating oscillator" Optics Communications, North-Holland Pub. Co. Amsterdam, NL, vol. 178, No. 4-6, May 2000, pp. 449-456, XP004204293, ISSN: 0030-4018 (the whole document).

A.A. Betin, "Phase Conjugation Based on Thermal Nonlinearity," paper NThB1, Nonlinear Optics:Materials, Fundamentals,and Applications Conference,Maui,HI, pp336-339,Jul.,1996.

A.A. Betin,R.Forber,S.C.Matthews and M.S.Mangir,"1 ms Long Pulse Nd: YAG Laser With Loop PCM,"paper CWKI presented at CLEO 1997,p. 283,1997.

A.A.Betin,S.C.Matthews,and M.S.Mangir,"Phase Conjugation of Depolarized Light With a Loop PC",Nonlinear Optics:Materials,Fundamentals,and Applications Conference, Kauai,HI,1998.

* cited by examiner

SELF-ADJUSTING INTERFEROMETRIC OUTCOUPLER AND METHOD

BACKGROUND OF THE INVENTION

1. Field of the Invention

The present invention relates to optics. More specifically, the present invention relates to outcouplers for master oscillator power amplifier (MOPA) systems.

2. Description of the Related Art

The High Energy Laser (HEL), because of its rapid time of flight, pointing agility, precision, lack of collateral damage effects, and lack of traceable residue, is an effective weapon against a broad range of military targets. The diode-pumped solid-state laser, because of its high electrical efficiency, relatively low weight, compact packaging, lack of consumables (except sunlight or fuel), and lack of toxic and corrosive effluents is compatible with many military platforms, including fixed installations, ground vehicles, surface ships, submarines, rotocraft, tactical and strategic aircraft, and spacecraft.

One of the most attractive approaches for a continuous operation weapon-class, high brightness solid-state laser uses Yb:YAG slabs in a two-pass master oscillator/power amplifier (MOPA) configuration with a vector loop phase conjugate mirror (LPCM). The basic phase conjugate (PC) MOPA architecture uses a small master oscillator, which delivers a low-power single-mode reference beam through an optical input/output coupler element (outcoupler) to the output end of a high power amplifier beamline. The beam is then amplified to medium power, picking up thermal lensing and wedging aberrations and is depolarized due to thermal stress birefringence. At this point the beam enters a phase conjugate mirror, which reverses the wavefront of the beam. The reflected, phase conjugate beam then makes a return pass through the aberrated amplifier beamline and the original wavefront is restored. A high power, high beam quality beam is delivered via the outcoupler.

One of the most critical components in this PC MOPA laser architecture is the outcoupler, which is responsible for inserting the low power master oscillator beam into the amplifier beamline and extracting the amplified beam from the beamline in a separate path. Ideally, the outcoupler would insert the oscillator beam with zero loss, extract the amplified beam with zero feedback into the oscillator, and generate no distortions that cannot be corrected by the LPCM. Several outcoupler schemes have been developed and used with the PC MOPA architecture. The Scalable High Energy Raman Laser (SHERL) was the first moderate power PC MOPA device demonstrated in the U.S., and used a Brewster plate in conjunction with a quarter wave plate for polarization outcoupling. This scheme is disclosed by Hans W. Bruesselbach in U.S. Pat. No. 4,734,911, entitled "Efficient Phase Conjugate Laser," issued Mar. 29, 1988 (the teachings of which are incorporated herein by reference). This approach provided very efficient transmission of the amplified beam with low oscillator feedback. However, it was not efficient in the injection of the oscillator beam into the amplifier beamline. Therefore, a higher power oscillator is required than would be required with an ideal outcoupler.

The most straightforward outcoupler approaches for high power are based on reciprocal optical elements such as reflective/refractive beamsplitters and diffraction gratings. These devices are designed to promote efficient outcoupling for the high power beam. The coupling efficiency of the master oscillator input path, however, may be very low for these devices, necessitating a relatively high power master oscillator. High oscillator power is problematic for two reasons: (1) reduced overall efficiency of the MOPA and (2) difficulty in obtaining high oscillator beam quality.

Lower power PC MOPA systems utilized a polarizing beamsplitter in conjunction with a permanent-magnet Faraday rotator and quartz rotator combination to provide a non-reciprocal optical path for efficient outcoupling. The Faraday rotator and polarization beamsplitter approach works well at average powers up to a kilowatt. The HEL application, however, calls for hundreds of kilowatts to megawatts of average power, which is beyond the current state-of-the-art in Faraday devices.

Non-Faraday outcoupler techniques based on non-reciprocal interferometric elements have been proposed which show promise in scaling to weapon-class power levels. In the early 1990s, several high average power interferometric outcoupler configurations were developed which rely on the Stokes frequency shift inherent in the stimulated Brillouin scattering (SBS) phase conjugation process to create a non-reciprocal optical path. The first disclosed by T. O'Meara in U.S. Pat. No. 5,126,876, entitled "Master Oscillator Power Amplifier with Interference Isolated Oscillator," issued Jun. 30, 1992, the teachings of which are incorporated herein by reference, uses a Mach-Zender interferometer as the outcoupling element directly. This interferometer is used as the non-reciprocal element to separate the input and output paths through constructive interference in one direction and destructive interference in the other. Because the Stokes shift is fixed by the material parameters of the SBS medium (determined by sound velocity), the wavelength of the master oscillator and the length of the interferometer legs must be controlled to ensure good master oscillator isolation and input/output coupling efficiency.

The second interferometric approach uses the interferometer in the phase conjugate leg to effect a 90 degree polarization rotation on the output pass, which creates a non-reciprocal path through a polarization beamsplitter. The operation of this interferometric polarization outcoupler is disclosed in Basov et al, "Laser Interferometer with Wavelength-Reversing Mirrors," Sov. Phys. JTEP, Vol. 52, No. 5, November 1980, pp 847–851. Inventive improvements to this basic scheme were disclosed by D. Rockwell in U.S. Pat. No. 5,483,342, entitled "Polarization Rotation with Frequency Shifting Phase Conjugate Mirror and Simplified Interferometric Output Coupler," issued Jan. 9, 1996.

A problem with these prior art interferometric outcoupler approaches is that they must be used with a PCM that which has a fixed and predetermined frequency shift, typically an SBS PCM. The SBS PCM has several disadvantages: it does not work well with continuous waveforms, and it requires high peak power but cannot handle high average power. Furthermore, the prior art interferometric outcoupler approaches are sensitive to length changes in the interferometer optical paths resulting from thermal expansion and warping of the structure, plastic deformation and creep, shock and vibration induced structural compliance, or refractive index changes of the optics and intervening atmosphere, as well as any changes in the frequency of operation of the oscillator or phase conjugate mirror.

Hence, a need exists in the art for an efficient outcoupler for high power MOPA systems which can compensate for any frequency changes in the outcoupler, oscillator, and phase conjugate mirror.

SUMMARY OF THE INVENTION

The need in the art is addressed by the self-adjusting interferometric outcoupler of the present invention. In the most general sense, the invention is an optical system comprising a first mechanism for generating a first beam, a second mechanism for receiving the first beam and returning a second beam, and an interferometer positioned to couple the first beam to the second mechanism and to receive and output the second beam, wherein the interferometer is also shared by the first mechanism and/or the second mechanism to control the frequency of the first beam and/or the second beam, respectively.

In the illustrative embodiment, the first mechanism is a master oscillator, the second mechanism is a phase conjugate mirror, and the system further includes a power amplifier positioned to amplify the first beam during a first pass and to amplify the second beam during a second pass. In the illustrative embodiment, the novel system does not rely on the Stokes frequency shift in SBS and therefore can be used with other phase conjugation media and methods, such as thermal nonlinearity in a loop configuration or four-wave mixing. It does not require tight tolerances in the construction of the interferometer and is always self-tuned. Similarly, it is not sensitive to length changes in the interferometer optical paths resulting from thermal expansion and warping of the structure, plastic deformation and creep, shock and vibration induced structural compliance, or refractive index changes of the optics and intervening atmosphere.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
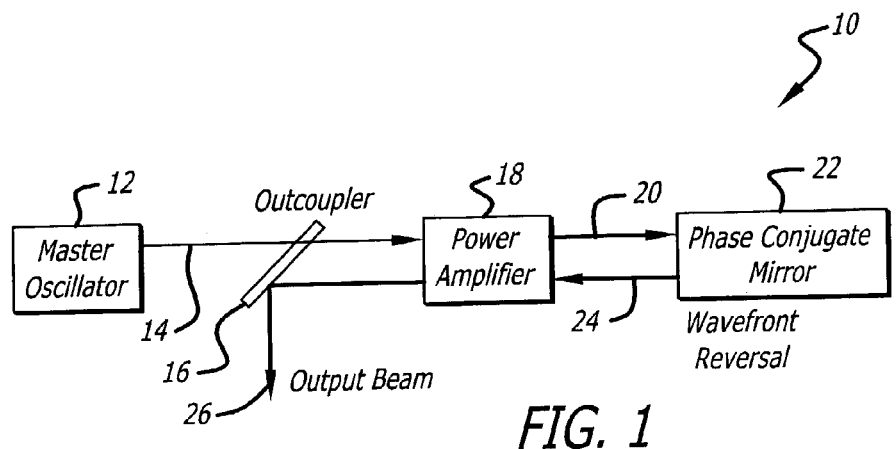
FIG. 1 is a simplified optical schematic of a basic phase conjugate MOPA configuration of conventional design and construction.

FIG. 1 is a simplified optical schematic of a basic phase conjugate (PC) master oscillator/power amplifier (MOPA) configuration 10 of conventional design and construction. A small master oscillator 12 delivers a low-power single-mode reference beam 14 through an optical input/output coupler element (hereinafter outcoupler) 16 to the output end of a high power amplifier beamline 18. The beam is amplified to medium power, picking up thermal lensing and wedging aberrations and is depolarized due to thermal stress birefringence. At this point the amplified beam 20 enters a phase conjugate mirror 22, which reverses the wavefront of the beam. The reflected, phase conjugate beam 24 then makes a return pass through the aberrated amplifier beamline 18 and the original wavefront is restored. A high power, high beam quality beam 26 is delivered via the outcoupler 16.

This two-pass PC MOPA architecture has been successfully used on numerous programs to enhance the brightness and reduce the beam wander of solid-state lasers. Self-pumped PCM devices based on stimulated Brillouin scattering (SBS) have been used in the past for high peak power (Q-switched) devices. Attempts to apply the SBS PCM to continuous wave (CW) or quasi-CW beams have not resulted in any practical solutions. In the late 1980s a new type of phase conjugate mirror was demonstrated in Russia for high power $CO_2$ lasers. This new conjugator is based on a thermal nonlinearity in liquids and, unlike SBS, is suitable for CW operation. This has been developed as a "vector" loop PCM for correction of depolarized beams.

Figure 2:
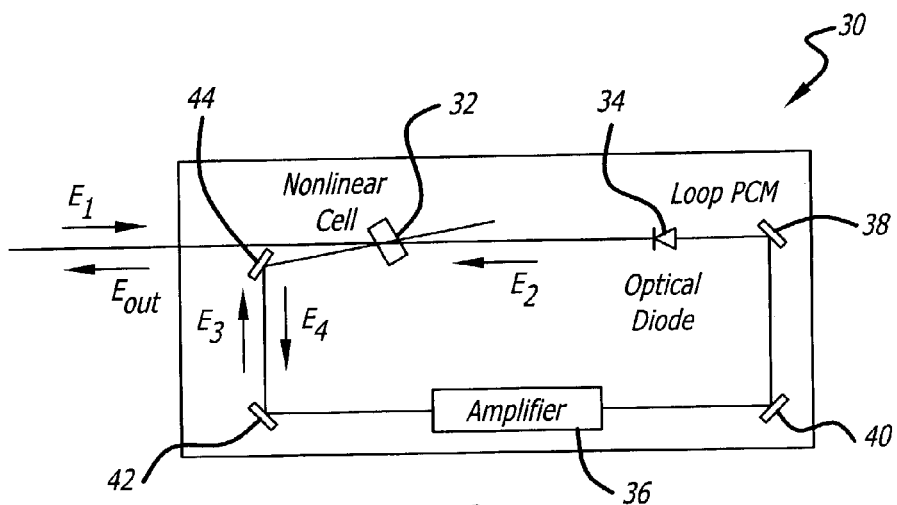
FIG. 2 is an optical schematic of a loop PCM based on a thermal nonlinearity.

FIG. 2 is an optical schematic of a loop PCM 30 based on a thermal nonlinearity. The input beam (denoted $E_1$) from the amplifier beamline enters a nonlinear medium 32 and traverses the loop in a clockwise direction. An optical diode 34 is used to prevent saturation of the gain medium (amplifier) 36 in this direction. Two mirrors (38, 40) direct the beam to an amplifier 36. This clockwise beam $E_3$ is directed by two more mirrors (42, 44) back into the nonlinear medium 32 where it interferes with the input beam $E_1$ and writes real-time holographic gratings in the medium. The grating serves as a holographic resonator mirror, which allows a laser mode $E_2$ to build from noise in the preferred counterclockwise direction around the loop. A portion of this beam $E_{OUT}$ is coupled out of the PCM through the grating in the nonlinear medium 32, in the opposite direction to the input beam $E_1$. Under the proper conditions, the grating is set up such that the output beam $E_{OUT}$ is a phase conjugate replica of the input beam $E_1$. Using this basic PC MOPA architecture in a vector (or polarization-correcting) configuration, near-diffraction limited restoration with very severe optical aberrations (100×D.L.) and near-perfect birefringence correction (>20 dB contrast) with completely depolarized beams can be achieved.

The loop PCM configuration is described more fully in the following references the teachings of which are incorporated by reference herein. References 3, 5, and 6 describe the vector configuration in particular.
1. A. A. Betin, "Phase Conjugation Based On Thermal Nonlinearity," paper NThB1 presented at *Nonlinear Optics: Materials, Fundamentals, and Applications Conference*, Maui, Hi., pp. 336–339, July 1996.
2. A. A. Betin, R. Forber, S. C. Matthews, and M. S. Mangir, "1 ms Long Pulse Nd:YAG Laser With Loop PCM," paper CWK1 presented at CLEO 1997, p. 283, 1997.
3. A. A. Betin, S. C. Matthews, and M. S. Mangir, "Phase Conjugation of Depolarized Light with a Loop PC", *Nonlinear Optics: Materials, Fundamentals, and Applications Conference*, Kauai, Hi., July 1998.
4. A. A. Betin, M. S. Mangir, and D. A. Rockwell, "Compact Phase-Conjugate Mirror Utilizing Four-Wave Mixing in a Loop Configuration," U.S. Pat. No. 5,726,795; assigned to Hughes Electronics, March 1998.
5. A. A. Betin and M. S. Mangir, "Loop Phase-Conjugate Mirror for Depolarized Beams," U.S. Pat. No. 5,729,380; assigned to Hughes Electronics, March 1998.
6. A. A. Betin, "Polarization Insensitive Faraday Attenuator," U.S. Pat. No. 6,278,547; assigned to Hughes Electronics Corp., August 2001.
7. A. A. Betin, H. W. Bruesselbach, and M. S. Mangir, "Apparatus and Method for Enhanced Laser Machining by Optimization of Pulse Duration and Spacing," U.S. Pat. No. 6,346,686; assigned to Hughes Electronics Corp., February 2002.

As discussed above, one of the most critical components in the PC MOPA laser architecture is the outcoupler, which is responsible for inserting the low power master oscillator beam into the amplifier beamline and extracting the amplified beam from the beamline in a separate path.

Figure 3:
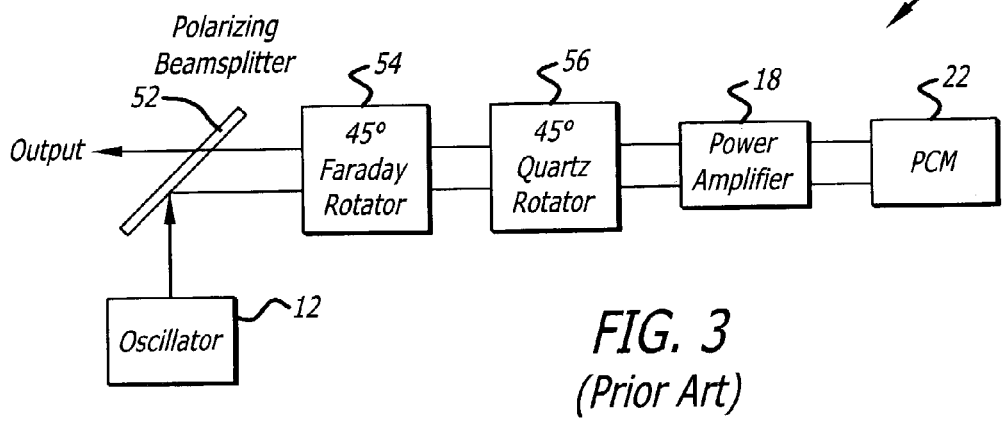
FIG. 3 is a schematic of a conventional Faraday rotator and polarization beamsplitter outcoupler approach of a lower power PC MOPA system.

FIG. 3 is a schematic of a conventional Faraday rotator and polarization beamsplitter outcoupler approach of a lower power PC MOPA system 50. The beam from the master oscillator 12 is reflected off a polarization beamsplitter 52 through a permanent-magnet Faraday rotator 54 and quartz rotator 56 combination to the power amplifier 18 and PCM 22. On the return pass, the beam is output through the polarization beamsplitter 52. The Faraday rotator and polarization beamsplitter approach works well at average powers up to a kilowatt, but Faraday devices able to handle substantially higher powers are not yet available.

Figure 4A:
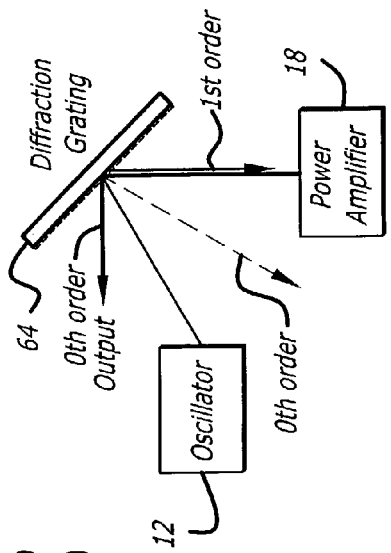
FIG. 4a is a schematic of a conventional high power outcoupler approach based on reflective/refractive beamsplitters.
Figure 4B:
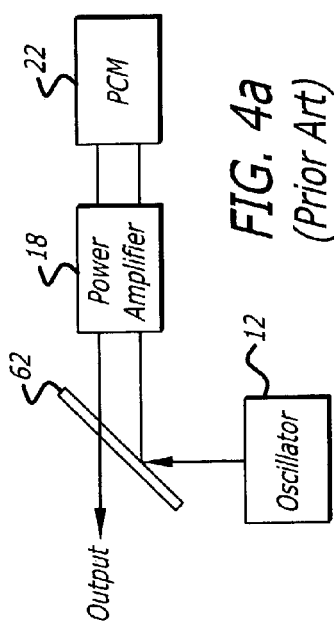
FIG. 4b is a schematic of a conventional high power outcoupler approach based on diffraction gratings.

FIGS. 4a and 4b are schematic diagrams of PC MOPA architectures using conventional high power outcoupler approaches based on reflective/refractive beamsplitters and diffraction gratings, respectively. In FIG. 4a, the beam from the master oscillator 12 is reflected off a reflective/refractive beamsplitter 62 and directed to the power amplifier 18 and PCM 22. On the return pass, the amplified beam is output through the beamsplitter 62. In FIG. 4b, the beam from the master oscillator 12 is split into a two orders by a diffraction grating 64. The $1^{st}$ order is directed to the power amplifier 18 and the $0^{th}$ order is lost. On the return pass, the $0^{th}$ order of the amplified beam from the diffraction grating 64 is output. The diffraction grating has an advantage over the reflective/refractive beamsplitter in that the outcoupler-induced optical distortions are compensated, minimizing the non-common path errors for high power operation. These devices are designed to promote efficient outcoupling for the high power beam. The coupling efficiency of the master oscillator input path, however, may be very low for these devices, necessitating a relatively high power master oscillator. While this low input coupling efficiency does not appreciably affect the overall efficiency of the laser system, higher-power master oscillators of diffraction-limited beam quality do entail an additional development risk and add to the size and weight of the system.

Figure 5:
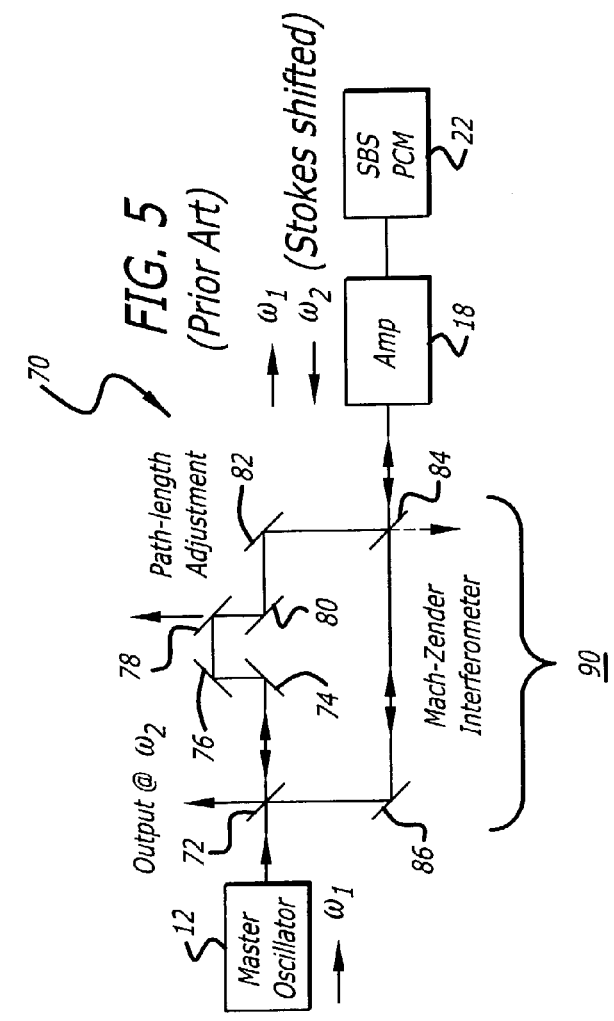
FIG. 5 is a schematic of a PC MOPA system using a conventional interferometric outcoupler scheme.

FIG. 5 is a schematic of a PC MOPA system 70 using a conventional interferometric outcoupler scheme as disclosed by O'Meara in U.S. Pat. No. 5,126,876. This approach uses a Mach-Zender interferometer 90 as the outcoupling element directly. The interferometer 90 is used as the non-reciprocal element to separate the input and output paths through constructive interference in one direction and destructive interference in the other. An input beam from the master oscillator 12 is received by a first beam splitter 72 and split into two paths, one towards a mirror 82 and another towards a mirror 84. One path includes several additional mirrors (74, 76, 78, 80) for adjusting the path-length. Beams from both paths are combined at a second beamsplitter 84 and directed to the amplifier 18 and SBS PCM 22. On the return pass, the amplified beam is split into the same two paths by the second beamsplitter 84, and output through the first beamsplitter 72. This approach relies on the Stokes frequency shift inherent in the stimulated Brillouin scattering (SBS) phase conjugation process to create a non-reciprocal optical path. Because the Stokes shift is fixed by the material parameters of the SBS medium (determined by sound velocity), the wavelength of the master oscillator ($\omega_1$)) and the length of the interferometer legs must be controlled to ensure good master oscillator isolation and input/output coupling efficiency.

The present invention is a self-adjusting interferometric outcoupler scheme which uses a single component to control the master oscillator frequency, control the frequency shift in the phase conjugated beam, and perform the input/output coupling within the MOPA. It does not rely on the Stokes frequency shift in SBS and therefore can be used with other phase conjugation media and methods, such as thermal nonlinearity in a loop configuration or four-wave mixing (FWM). It does not require tight tolerances in the construction of the interferometer and is always self-tuned. Similarly, it is not sensitive to length changes in the interferometer optical paths resulting from thermal expansion and warping of the structure, plastic deformation and creep, shock and vibration induced structural compliance, or refractive index changes of the optics and intervening atmosphere.

Figure 6:
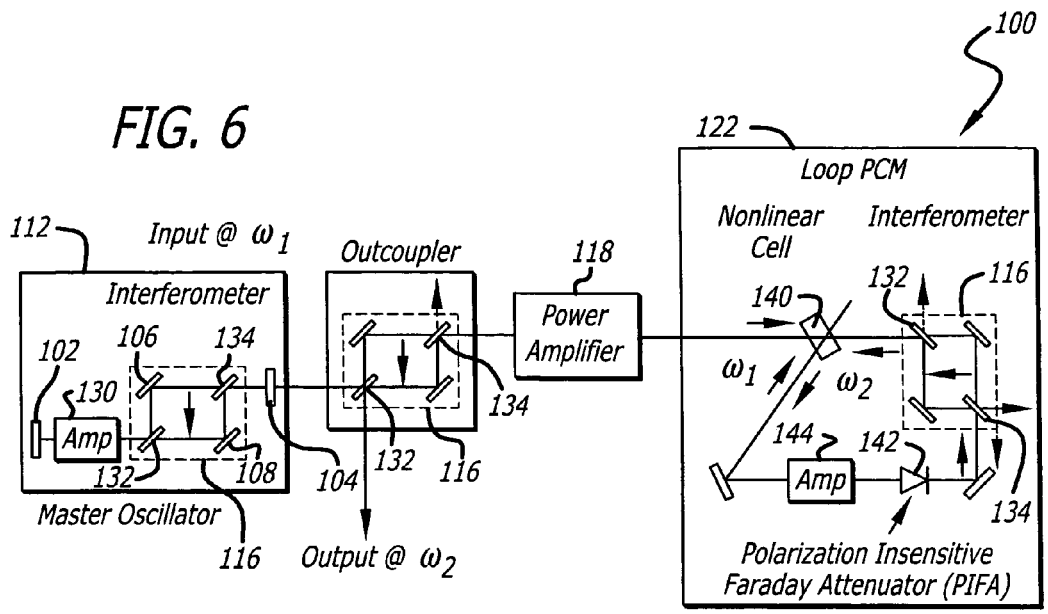
FIG. 6 is a simplified optical schematic of a MOPA system with a self-adjusting interferometric outcoupler scheme designed in accordance with teachings of the present invention.

FIG. 6 is a simplified optical schematic of a MOPA system 100 with the self-adjusting interferometric outcoupler scheme designed in accordance with teachings of the present invention. In this implementation, a Mach-Zender interferometer 116 functions as a wavelength-dependent optical switch. The same interferometer 116 is used to satisfy three separate functions, as described below. For simplicity, the interferometer 116 is shown in FIG. 6 as three separate functional elements, but in practice it is actually just one physical device and the optical train is folded such that the same interferometer is shared by the oscillator 112, PCM 122, and PC MOPA outcoupler 116.

Figure 7:
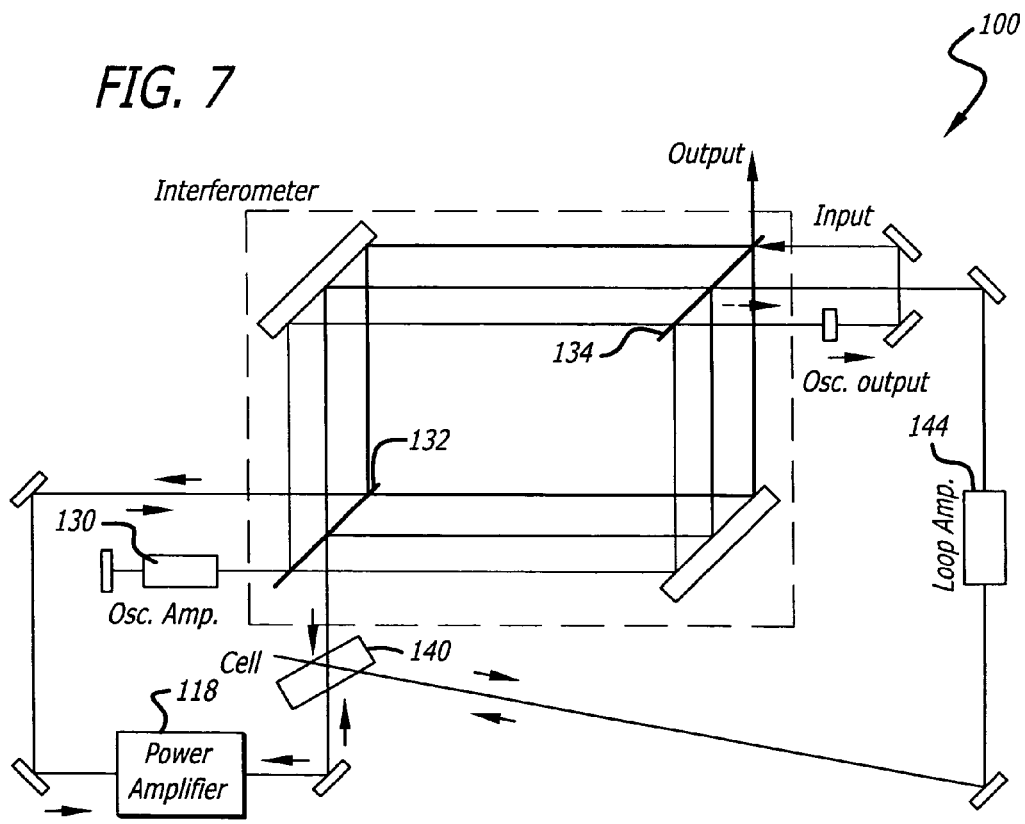
FIG. 7 is a schematic showing the system folded with a shared interferometer.

FIG. 7 is a schematic showing the system folded with a shared interferometer. The master oscillator 112 includes an amplifier 130 and the interferometer 116 positioned within a first resonator mirror 102 and an output resonator mirror 104. Energy from the amplifier 130 is input to the interferometer 116 at a first beamsplitter 132 and split into two paths towards a first mirror 106 and a second mirror 108. Energy from the two paths is combined and output at a second beamsplitter 134. The beam from the master oscillator 112 is directed back into the interferometer 116, now acting as an outcoupler, in the same orientation as the oscillator function. From the outcoupler 116, the beam goes through a power amplifier 118 to a loop PCM (LPCM) 122. The LPCM 122 includes a nonlinear cell 140, the interferometer 116, a polarization insensitive Faraday attenuator (PIFA) 142, and an amplifier 144. Note that the orientation of the interferometer 116 is the same for the oscillator and outcoupler functions, but has been rotated 90° clockwise within the LPCM 122, as indicated by the orientation of the arrow within the interferometer schematic. The output beam from the LPCM 122 is directed back through the power amplifier 118 and output by the interferometer 116.

This outcoupler scheme is termed "self-adjusting," because the oscillator wavelength, PCM frequency shift, and outcoupler wavelength selectivity track the same changes in interferometer path length to ensure high input and output coupling efficiency and good oscillator isolation over temperature and other environmental conditions. It should be understood that the interferometric outcoupler topology shown in FIG. 6 is schematic only and different topologies may be used without departing from the spirit and scope of this invention. In particular re-imaging optical elements may be used with distorted beams so that the two beamsplitters within the interferometer are at conjugate planes (one imaged onto the other).

1. Master Oscillator Frequency Selection

Inserting this interferometer 116 within the resonant cavity of the master oscillator 112, ensures that the laser will oscillate only on longitudinal modes which satisfy the condition for constructive interference in the preferred horizontal direction as shown in FIG. 6. The path lengths in the interferometer 116 are coarsely chosen to ensure that the following three conditions are satisfied for one or more values of $\omega_1$ that are somewhere within the gain bandwidth of the lasing medium. For simplicity, only one optical frequency (with angular frequency ($\omega_1$) is identified which satisfies this condition, however, multiple longitudinal modes may be generated within the gain bandwidth of the laser medium, thereby producing a multi-longitudinal mode output of the master oscillator 112, with each mode satisfying the condition for constructive interference in the horizontal direction through the interferometer.

Resonant cavity conditions for oscillation in the Master Oscillator:

$$2\omega_{1i} L_{1\ MO}/c = 2\pi i \quad\quad\quad 1$$

$$2\omega_{1j} L_{2\ MO}/c = 2\pi j \quad\quad\quad 2$$

$$\omega_{1k}(L_{2\ MO} - L_{1\ MO})/c = \pi + 2\pi k \quad\quad\quad 3$$

where: $\omega_{1i}$=angular frequency of radiation oscillating on $i^{th}$ order (similar for $j^{th}$ and $k^{th}$ orders)

$L_{1\ MO}$=master oscillator (MO) resonator length measured through first leg of interferometer $L_{2\ MO}$=master oscillator (MO) resonator length measured through second leg of interferometer c=speed of light Conditions 1 and 2 represent the normal resonant cavity condition for a Fabry-Perot laser cavity where the round trip optical length must be an integral number of wavelengths. Condition 3 represents the condition for constructive interference within the interferometer. These three conditions are met for some value of $\omega_1$ when there are integer values of i, j, and k which solve the three equations simultaneously.

Note that the reflection/transmission characteristics of the beamsplitters within the interferometer do not affect the solution to the resonant cavity conditions, but do affect the insertion loss and finesse of the resonator.

2. Frequency Shift Generation in Phase Conjugation Mirror (PCM) Loop

In the PCM loop 122, the same interferometer 116 functions as a spectral filter. Note that, for the orientation of the outcoupler 116 within the loop resonator, most of the amplified light at $\omega_1$ entering the loop PCM 122 and traveling in the clockwise direction will be rejected from the loop by the interferometer 116. A small portion of the $\omega_1$ light will leak, providing a strongly attenuated reference beam at $\omega_1$ propagating clockwise around the loop. This attenuation is offset by the gain of the amplifier 144 within the loop such that a sufficiently strong reference signal is available to interfere with the incident beam within the nonlinear cell 140, and a real-time hologram is recorded in the nonlinear medium. If the amplifier gain is greater than the reflectivity of the holographic mirror and other losses in the loop, laser light will build up through the process of stimulated emission in the amplifier. Because the interferometer 116 is lossy at $\omega_1$, no laser mode will build at this frequency. Lasing will occur at other frequencies (e.g., $\omega_2$) which produce constructive interference in the path through the interferometer 116. A directional switch 142, such as a Faraday rotator, is also included within the loop to encourage buildup of resonant modes at $\omega_2$ in the counterclockwise direction around the loop. (A Faraday rotator can be used in the PCM because the power in the loop is much smaller than that of the final output, typically less than 1 kW.) The result is a phase conjugated output beam from the loop PCM 122 that is frequency shifted by the interferometer 116 relative to the incident beam.

Resonant cavity conditions for oscillation in the Loop PCM:

$$\omega_{2p} L_{1\ LPCM}/c = 2\pi p + \theta \quad\quad\quad 4$$

$$\omega_{2q} L_{2\ LPCM}/c = 2\pi q + \theta \quad\quad\quad 5$$

$$\omega_{2s}(L_{2\ LPCM} - L_{1\ LPCM})/c = 2\pi s \quad\quad\quad 6$$

where: $\omega_{2p}$=angular frequency of radiation oscillating on $p^{th}$ order (similar for $q^{th}$ and $s^{th}$ orders)

$L_{1\ LPCM}$=loop PCM (LPCM) resonator length measured through first leg of interferometer $L_{2\ LPCM}$=loop PCM (LPCM) resonator length measured through second leg of interferometer $\theta$=polar imaginary portion of complex nonlinear constant of the form $\mu = r\ exp(i\theta)$ Note: the complex nonlinear constant, $\mu$, describes the nonlinear interaction between the diffracted electromagnetic field $E_4$ and beams $E_1$, $E_2$, and $E_3$ such that:

$$E_4 = \mu E_2(E_1 E_3^*)$$

For thermal nonlinearity, $\mu = i\ r$ and $\theta = \pi/2$. Including the term $\theta$ is for generality only and does not change the essence of this invention.

Conditions 4 and 5 represent the normal resonant cavity condition for a ring laser cavity where the round-trip optical length in one direction must be an integral number of wavelengths. Condition 6 represents the condition for constructive interference within the interferometer. These three conditions are met for some value of $\omega_2$ when there are integer values of p, q, and s which solve the three equations simultaneously. Again, the reflection/transmission characteristics of the beamsplitters within the interferometer do not affect the solution to the resonant cavity conditions, but do affect the attenuation of the $\omega_1$ beam. The insertion loss of the interferometer within the loop at $\omega_2$ is essentially zero. Beams $E_1$ and $E_3$ inside the LPCM must be sufficiently coherent to write a hologram. Also, the resonant cavity condition requires that $L_{1\ LPCM}$ be close to an integer multiple of $2\ L_{1\ MO}$, with an accuracy of less than the coherence length (i.e., number of longitudinal modes) of the oscillator beam.

3. Input/Output Coupling

The same interferometer 116 is used as the input/output coupler at the end of the phase conjugate amplifier beamline, as in the prior art invention by O'Meara. In the present invention, the master oscillator beam is the proper frequency ($\omega_1$) to produce constructive interference in the horizontal direction through the interferometer 116, allowing the oscillator beam to efficiently couple into the beamline. The amplified, phase conjugated beam returning from the beamline is the proper frequency ($\omega_2$) to produce constructive interference in the horizontal-to-vertical direction through the interferometer 116, allowing the high power beam to be efficiently coupled out of the beamline. It is important to note that, in the present invention, the selection of the master oscillator frequency ($\omega_1$) and PCM-shifted frequency ($\omega_2$) is automatic and always correct for proper outcoupler performance, regardless of optical path length changes in the interferometer 116.

Figure 8:
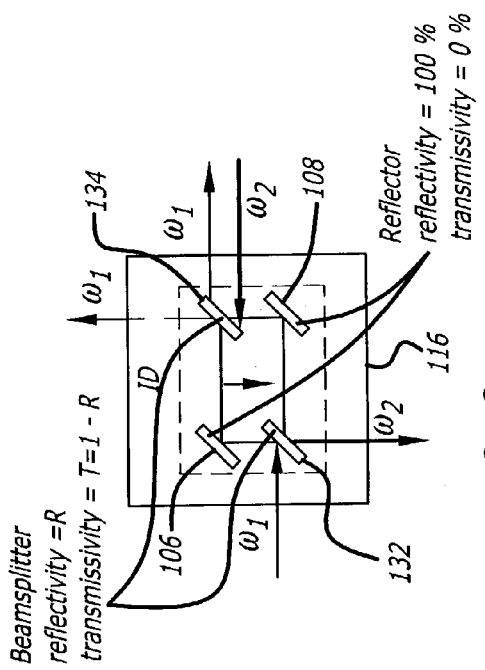
FIG. 8 is a schematic of the interferometer with the two beamsplitters having identical reflection/transmission characteristics.

The input coupling efficiency, output coupling efficiency, and amplifier feedback into the oscillator are determined by the reflection/transmission characteristics of the two beamsplitters (132, 134) within the interferometer 116. Consider the schematic in FIG. 8 where the two beamsplitters (132, 134) have identical reflection/transmission characteristics, there is no absorption loss within the beamsplitters, and the reflectors are 100% reflective. For this condition, the fraction of the oscillator beam power that is coupled into the amplifier beamline at $\omega_1$ is given by:

Input coupling efficiency=$4R(1-R)$ where: R=power reflectivity of the beamsplitter The fraction of the amplified beam power that is coupled out of the beamline at $\omega_2$ is designed to always be 100%. And the attenuation of $\omega_1$ within the LPCM is given by:

LPCM attenuation at $\omega_1$:$1-[4R(1-R)]$

Varying the reflectivity, R, advantageously allows the attenuation within the LPCM to be controlled.

Figure 9:
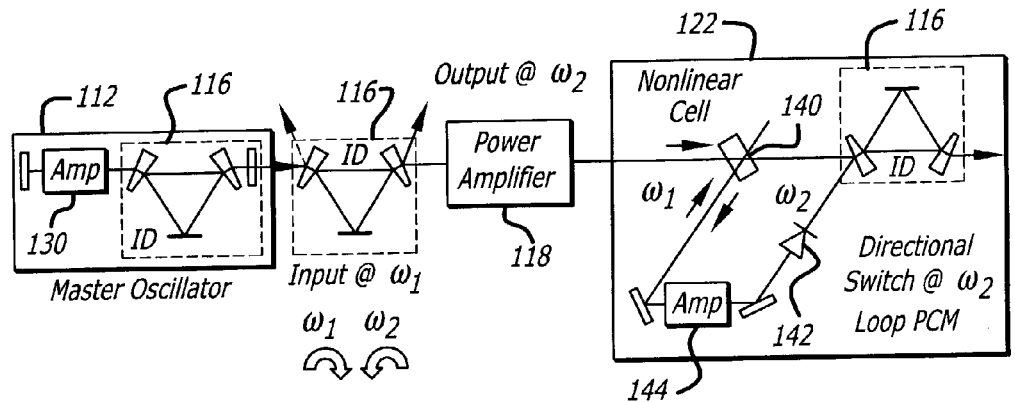
FIG. 9 shows a schematic of an alternate embodiment of the self-adjusting interferometric outcoupler with the Sagnac form used as the interferometer.

In another embodiment of the invention, a Sagnac interferometer is used in place of the Mach-Zender as the interferometer of FIG. 6, which may provide improved performance with distorted beams. FIG. 9 shows a schematic of an alternate embodiment of the self-adjusting interferometric outcoupler with the Sagnac form used as the interferometer 116.

Figure 10:
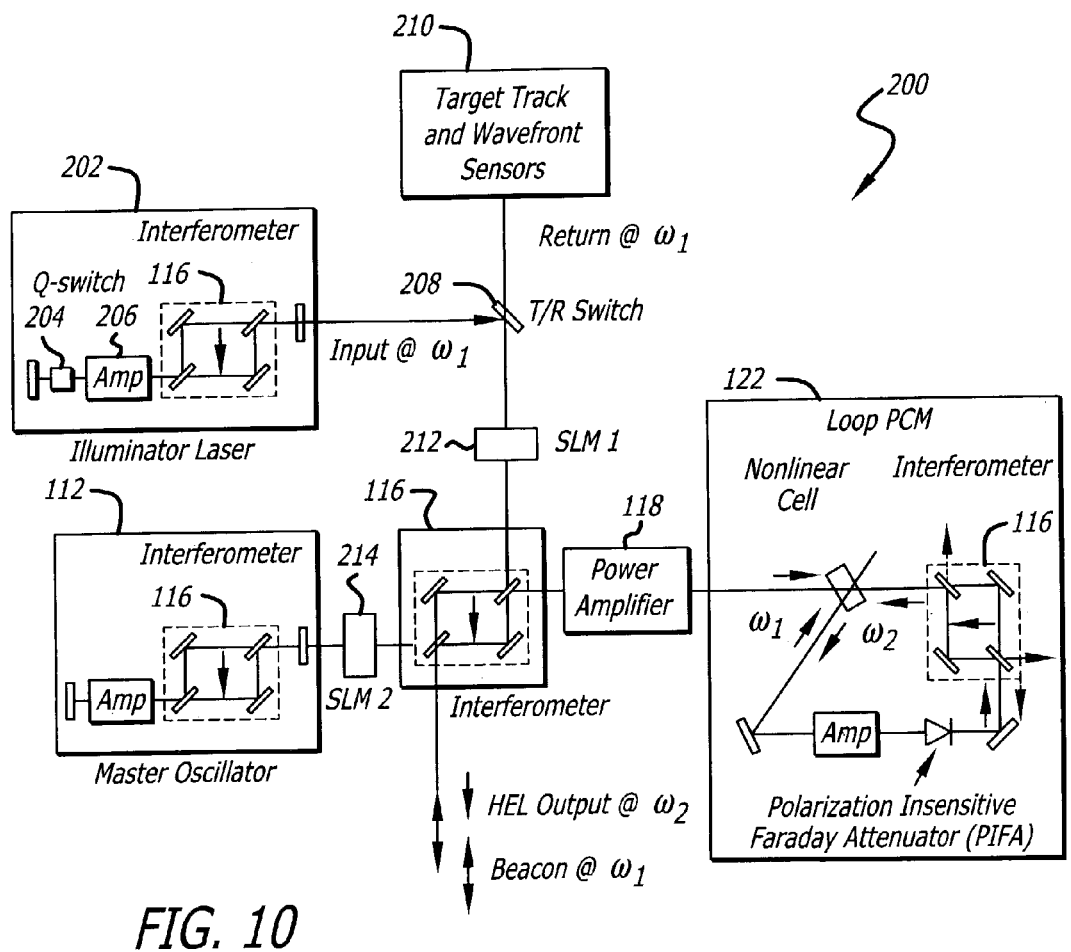
FIG. 10 shows an advanced beam control architecture using the self-adjusting interferometric outcoupler both as an outcoupler for the PC MOPA and as an aperture sharing element in accordance with the teachings of the present invention.

In yet another embodiment of the invention, the self-adjusting interferometric outcoupler can be used both as an outcoupler for the PC MOPA and as the aperture sharing element for an advanced beam control architecture 200, in accordance with the teachings of Byren and Trafton in co-pending patent application PD-00W089, entitled "System and Method for Effecting High-Power Beam Control with Adaptive Optics in Low Power Beam Path," as shown in FIG. 10.

In this implementation, the common interferometer 116 may be shared by a Q-switched illuminator laser 202 including a Q-switch 204 and amplifier 206 to force the illuminator laser frequency to be the same as that of the master oscillator 112 ($\omega_1$). After reflecting off a transmit/receive (TR) switch 208, which may be a combination of a polarizing beamsplitter and quarter waveplate, the illuminator beam is transmitted to the target through the outcoupler interferometer 116 along with the HEL beam. The outcoupler interferometer 116 is oriented so that $\omega_1$ experiences constructive interference in the vertical direction. Similarly, the return beam passes through the interferometer 116 vertically and transmits through the T/R switch 208, where it is used for active tracking and wavefront sensing 210. In this configuration, there is no feedback path for the high power beam into the target track and wavefront sensors 210.

Two spatial light modulators (SLM) are included in the low power beam paths to effect adaptive optics compensation. The first SLM 212 corrects the beam path for atmospheric distortions sensed by the target wavefront sensor 210, thereby providing an undistorted path for the target track sensor and illuminator laser. The second SLM 214 predistorts the master oscillator beam with the conjugate of the correction applied to the first SLM 212. This predistorted beam is then amplified in the power amplifier 118 and conjugated in the loop PCM 122, giving the HEL output beam the proper wavefront to correct for atmospheric distortions on the path to the target.

Figure 11:
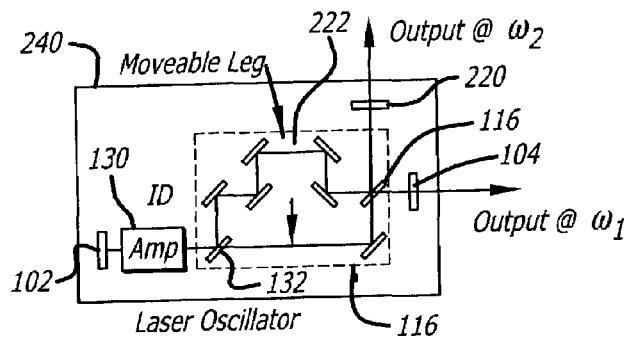
FIG. 11 shows an alternate laser architecture with a second lasing path in accordance with the teachings of the present invention.

Another inventive feature of this invention is shown in FIG. 11. This laser architecture 240 is similar to the master oscillator shown in FIG. 6, which generates one or more frequencies ($\omega_1$) for which constructive interference occurs in the horizontal path through the intracavity interferometer 116. A second lasing path is created by inserting another resonator output mirror 220 oriented such that lasing occurs at frequencies ($\omega_2$) for which constructive interference occurs in the horizontal-to-vertical path through the intracavity interferometer 116. The frequencies ($\omega_2$) are similar to that produced by the frequency shift in the PCM described above. Controlling the length of one interferometer leg relative to the other, as indicated by the "trombone" path 222 in the figure, will accurately control the difference between the oscillating frequencies, $\omega_1$ and $\omega_2$. Etalons may also be used within each interferometer leg to select specific operating frequencies.

Figure 12:
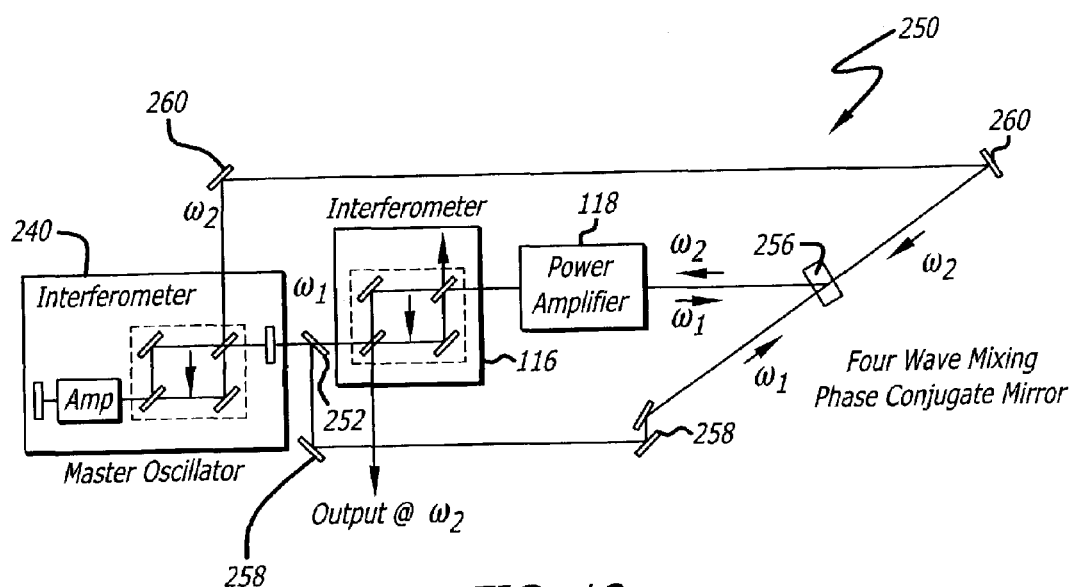
FIG. 12 is a schematic of a phase conjugate MOPA with four wave mixing designed in accordance with the teachings of the present invention.

One very useful application for the laser shown in FIG. 11 is as a master oscillator 240 in a phase conjugate MOPA wherein the phase conjugate mirror is implemented with four wave mixing. This embodiment is shown schematically in FIG. 12. A first beam $\omega_1$ from the master oscillator 240 enters a beamsplitter 252 and is split towards the interferometer 116, and directly towards a four wave mixing phase conjugate mirror 256 by a number of mirrors 258. From the interferometer the beam goes through the power amplifier 118 to the four wave mixing phase conjugate mirror 256. The second beam $\omega_2$ from the master oscillator 240 is directed towards the four wave mixing phase conjugate mirror 256 by a number of mirrors 260. The output beam at ($\omega_2$ from the four wave mixing phase conjugate mirror 256 is passed through the power amplifier 118 and output by the interferometer 116.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An optical system comprising:
   first means for generating a first beam of electromagnetic energy;
   second means for receiving said first beam and returning a second beam; and
   an interferometer positioned to couple said first beam to said second means and to receive and output said second beam, wherein said interferometer is also shared by said first means or said second means to control the frequency of the first beam or the second beam, respectively.

2. The invention of claim 1 wherein said system further includes third means for amplifying said first and second beams.

3. The invention of claim 1 wherein said first means is a master oscillator.

4. The invention of claim 2 wherein said third means is a power amplifier.

5. The invention of claim 4 wherein said amplifier is positioned to receive said first beam from said interferometer and output the beam to said second means during a first pass, and to receive said second beam from said second means and output the second beam to said interferometer during a second pass.

6. The invention of claim 1 wherein said second means is a phase conjugate mirror.

7. The invention of claim 1 wherein said second means is a loop phase conjugate mirror.

8. The invention of claim 1 wherein said second means is a four wave mixing phase conjugate mirror.

9. The invention of claim 1 wherein said interferometer is a Mach-Zehnder interferometer.

10. The invention of claim 1 wherein said interferometer is a Sagnac interferometer.

11. The invention of claim 3 wherein said master oscillator includes an amplifier and said interferometer positioned between a first resonator mirror and an output resonator mirror.

12. The invention of claim 11 wherein said master oscillator further includes a second output resonator mirror, wherein each output resonator mirror is placed at an output of said interferometer.

13. The invention of claim 7 wherein said loop phase conjugate mirror includes a non-linear cell, said interferometer, a directional switch, and an amplifier.

14. A master oscillator power amplifier system comprising:
   a master oscillator;
   a phase conjugate mirror in optical alignment with said master oscillator;
   an outcoupler in alignment with said phase conjugate mirror; and
   an interferometer, wherein said interferometer is positioned to outcouple a master oscillator beam and a phase conjugate beam.

15. A beam control architecture comprising:
   a master oscillator for generating a first beam;
   an amplifier positioned to amplify said first beam;
   a phase conjugate mirror for receiving the amplified beam and directing a phase conjugate of said beam back to said amplifier for a second pass;
   a Q-switched illuminator laser for generating a second beam; and
   an interferometer positioned to couple said first beam to said amplifier, to receive and output the phase conjugated beam, and to receive and output said second beam, wherein said interferometer is also shared by said master oscillator to control the frequency of the input beam, by said phase conjugate mirror to control the frequency shift in the phase conjugated beam, and by said illuminator laser to force the illuminator laser frequency to be the same as that of the master oscillator.

16. A method for outcoupling a master oscillator power amplifier system including the steps of:
   generating an input beam;
   amplifying said beam;
   receiving the amplified beam and directing a phase conjugate of said beam back to be amplified in a second pass; and
   positioning an interferometer to couple said input beam to said amplifying means, to receive and output the phase conjugated beam, to control the frequency of the input beam; and to control the frequency shift in the phase conjugated beam.

17. The invention of claim 14 wherein said interferometer is a wavelength-dependent optical switch.

* * * * *